Patented Feb. 22, 1938

2,109,183

UNITED STATES PATENT OFFICE

2,109,183

PROCESS FOR THE MANUFACTURE OF AZO DYESTUFFS

Hans Roos, Leverkusen-I. G.-Werk, Germany, assignor to General Aniline Works, Inc., New York, N. Y., a corporation of Delaware No Drawing. Application January 30, 1935, Serial No. 4,186. In Germany February 9, 1934

8 Claims. (Cl. 260—69)

The present invention relates to a process for the manufacture of azo dyestuffs.

In accordance with the present invention azo dyestuffs are prepared by causing an aromatic nitro compound to react upon an aromatic diamine or aromatic aminohydroxy compound in a caustic alkaline medium at elevated temperature. The reaction probably proceeds according to the following scheme:

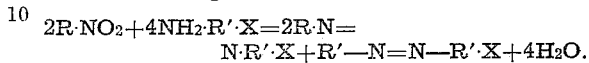

In this scheme R stands for a primary aromatic radical, such as a radical of the benzene or naphthalene series which may bear substituents, such as $NO_2$, $SO_3H$, $COOH$, $Cl$, $CH_3$, $SO_2NH_2$, a sulfanilido group and one or more azo groups, X stands for the amino or hydroxy group and R' stands for an aromatic radical, such as a radical of the benzene or naphthalene series which may bear substituents, such as a sulfo or carboxylic acid group.

Instead of using a diamine there can be used an acylated diamine because in the course of the reaction the acyl group is split off.

In carrying out my new process care is to be taken that such aromatic nitro compounds bearing in p-position to the nitro group a methyl group are excluded, because these compounds would give rise to the formation of stilbene compounds. Further for the present process dinitrodibenzyl and dinitrostilbene compounds do not come into consideration. Moreover, it should be mentioned that a halogen atom as substituent tends to split off when standing in certain positions, whereby side-reactions may be caused.

The process is advantageously carried out by heating the reacting components at elevated temperatures, say at temperatures between about 75° C. and about 180° C., in an indifferent solvent, such as water or an organic solvent, if necessary, with the application of superatmospheric pressure. As results from the above given formula, there is obtained an asymmetrical dyestuff besides the symmetrical one. The formation of this symmetrical dyestuff can be repressed by working with the addition of a weakly acting reducing agent, such as ethyl alcohol. The asymmetrical dyestuffs prepared in accordance with the present invention are of especial technical value, because part of them is only difficultly or not obtainable at all according to other methods. The products obtained in accordance with the invention can be directly used as dyestuffs or as starting material for the manufacture of other dyestuffs.

The invention is illustrated by the following examples, without being limited thereto:

*Example 1.*—16.7 kgs. of p-nitrobenzoic acid and 20 kgs. of p-phenylenediamine are dissolved in 400–500 litres of aqueous caustic soda lye of 3% strength and heated at 95° C. for several hours. On cooling the 4-aminoazobenzene-4'-carboxylic acid crystallizes in a pure form in a good yield. From the mother liquor there is separated by acidifying the 4.4'-diaminoazobenzene which on reduction yields the starting p-phenylenediamine.

If instead of p-phenylenediamine there is used p-aminophenol, p-hydroxy-azobenze-p'-carboxylic acid is obtained as asymmetrical dyestuff.

By using o- or m-nitrobenzoic acid there is obtained in the same manner 4-aminoazobenzene-2'- or -3'-carboxylic acid respectively.

*Example 2.*—21.5 kgs. of m-nitrobenzene-sulfonic acid and 20 kgs. of o-phenylenediamine are heated in 500 litres of aqueous caustic soda lye of 5% strength at 120° C. in an autoclave for several hours. After cooling, there can be isolated in a good yield by salting out the 2-aminoazobenzene-3'-sulfonic acid.

By using o-aminophenol there is obtained in an analogous manner the 2-hydroxyazobenzene-3'-sulfonic acid, while m-phenylenediamine yields the 3-aminoazobenzene-3'-sulfonic acid.

In an analogous manner as described in paragraph 1, o- or p-nitrobenzene sulfonic acid yield the 2-aminoazobenzene-2'- or -4'-sulfonic acid respectively.

*Example 3.*—21.5 kgs. of m-nitrobenzene sulfonic acid and 30 kgs. of p-phenylenediamine-sulfonic acid are dissolved in 400–500 litres of aqueous caustic soda lye of 5% strength and heated at about 100° C. for several hours. After cooling, there can be isolated the 4-aminoazobenzene-3.3'-disulfonic acid, while the solution contains the 4.4'-diaminoazobenzene-3.3'-disulfonic acid.

In an analogous manner as described in the preceding paragraph there can be used the o- and p-nitrobenzene sulfonic acids, whereby the latter yields the 4-amino-3.4'-azobenzene disulfonic acid up to the present prepared by sulfonating p-aminoazobenzene.

In an analogous manner as described in paragraph 1, the reaction can be performed with phenylenediamine-carboxylic acids and with p-aminosalicyclic acid.

*Example 4.*—20 kgs. of nitrobenzene and 36 kgs. of p-phenylenediamine sulfonic acid are heated in a rotating autoclave with 400 litres of aqueous caustic soda lye of 5% strength and 100 litres of spirit at 120° C. for several hours. After cooling, the 4-aminoazobenzene-3-sulfonic acid has separated in beautiful crystals in a good yield.

In an analogous manner the process can be carried out when using m- or p-chloronitrobenzene, nitrodiphenyls, nitronaphthalenes instead of nitrobenzene and/or 1.4-phenylenediamine-2.5- or -2.6-disulfonic acid instead of p-phenylenediamine sulfonic acid.

*Example 5.*—33.3 kgs. of 2-nitronaphthalene-4.8-disulfonic acid and 36 kgs. of p-phenylenediamine sulfonic acid are subjected to the conditions of reaction given in Example 3. On cooling, there crystallizes in a good yield the aminoazodyestuff of the following constitution:

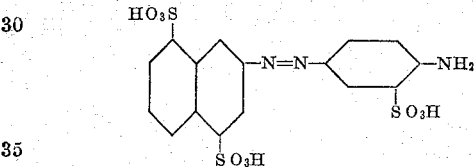

By salting out the output can be increased.

*Example 6.*—25 kgs. of 4-nitroazobenzene-4'-sulfonic acid and 36 kgs. of p-phenylenediamine sulfonic acid are subjected to the conditions of reaction as given in Example 3. Thus is obtained a disazodyestuff of the following constitution:

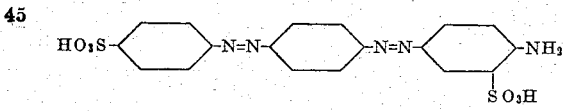

In this example the 4-nitroazobenzene-4'-sulfonic acid can, for example, be substituted by the dyestuff obtained by coupling diazotized p-nitraniline with salicylic acid or by coupling diazotized 4-nitraniline-2-sulfonic acid with aniline or m-toluidine. Thus are obtained the following disazodystuffs:

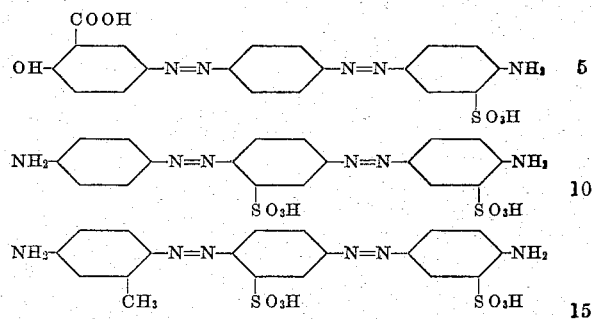

I claim:

1. Process for the manufacture of azo dyestuff which comprises causing an aromatic nitro compound with the exclusion of a p-methyl-nitro compound, a dinitrodibenzyl- and a dinitrostilbene compound to react upon a compound of the group consisting of primary aromatic diamines and aromatic aminohydroxy compounds in a caustic alkaline medium at an elevated temperature.

2. Process as claimed in claim 1, in which the process is carried out with the addition of ethyl alcohol as reducing agent.

3. Process as claimed in claim 1, in which the process is carried out in dilute aqueous caustic soda lye as alkaline agent.

4. Process as claimed in claim 1, in which the process is carried out in dilute aqueous caustic soda lye with the addition of ethyl alcohol as reducing agent.

5. Process for the manufacture of azo dyestuffs which comprises causing an aromatic nitro compound with the exclusion of a p-methyl-nitro compound, a dinitrodibenzyl- and a dinitrostilbene compound to react upon a compound of the group consisting of primary aromatic diamines and aromatic aminohydroxy compounds in a caustic alkaline medium at a temperature between about 75° C. and about 180° C.

6. Process as claimed in claim 5, in which the process is carried out with the addition of ethyl alcohol as reducing agent.

7. Process as claimed in claim 5, in which the process is carried out in dilute aqueous caustic soda lye as alkaline agent.

8. Process as claimed in claim 5, in which the process is carried out in dilute aqueous caustic soda lye with the addition of ethyl alcohol as reducing agent.

HANS ROOS.